United States Patent
Kamiguchi et al.

[11] Patent Number: 5,342,559
[45] Date of Patent: Aug. 30, 1994

[54] METHOD OF CONTROLLING ELECTRICALLY OPERATED INJECTION MOLDING MACHINE

[75] Inventors: Masao Kamiguchi; Minoru Kobayashi, both of Yamanashi, Japan

[73] Assignee: Fanuc Ltd., Yamanashi, Japan

[21] Appl. No.: 934,517

[22] PCT Filed: Feb. 3, 1992

[86] PCT No.: PCT/JP92/00102
§ 371 Date: Oct. 5, 1992
§ 102(e) Date: Oct. 5, 1992

[87] PCT Pub. No.: WO92/13701
PCT Pub. Date: Aug. 20, 1992

[30] Foreign Application Priority Data
Feb. 6, 1991 [JP] Japan .................. 3-34985

[51] Int. Cl.$^5$ ............................ B29C 45/76
[52] U.S. Cl. .................. 264/40.1; 264/40.5; 364/476; 425/145; 425/149
[58] Field of Search ............ 264/40.1, 40.5, 328.1; 425/135, 145, 146, 149, 156, 159, 166; 364/476

[56] References Cited

U.S. PATENT DOCUMENTS

| | | | |
|---|---|---|---|
| 4,812,268 | 3/1989 | Kamiguchi et al. | 364/476 |
| 4,842,801 | 6/1989 | Kamiguchi et al. | 364/476 |
| 4,849,678 | 7/1989 | Kamiguchi et al. | 364/476 |
| 5,200,126 | 4/1993 | Wenskus, Jr. et al. | 264/40.1 |

FOREIGN PATENT DOCUMENTS

| | | |
|---|---|---|
| 0461627 | 12/1991 | European Pat. Off. . |
| 62-198426 | 9/1987 | Japan . |
| 2-130117 | 5/1990 | Japan . |

OTHER PUBLICATIONS

Abstract of Japanese Pub. 62-18234 dated Jan. 27, 1987, Patent Abstracts of Japan, vol. 11, No. 191 (M-600) (2638), Jun. 19, 1987.
Abstract of Japanese Pub. 61-195818 dated Aug. 30, 1986, Patent Abstracts of Japan, vol. 11, No. 21 (M-555) (2468), Jan. 21, 1987.

Primary Examiner—Jill L. Heitbrink
Attorney, Agent, or Firm—Staas & Halsey

[57] ABSTRACT

An injection shaft of an electrically operated injection molding machine is entirely controlled based on its positions. In the injection process, an injection speed is changed over in accordance with a screw position for the processing at the injection process. In the subsequent dwell process, the screw is axially driven by a servomotor, a pressure applied to the resin is detected, and a difference between the pressure and a dwell pressure which has been set is found. The amount of movement in response to the difference is output to the servomotor for the drive thereof so as to keep the screw at the position. As a result, the dwell pressure is controlled by the screw position. Moreover, also in the metering process, the resin pressure is detected, and the screw is moved according to a difference between a set back pressure and a detected resin pressure so as to correspond with the back pressure which has been set. In this manner, the control of the dwell and back pressure can also be performed through the control of the screw positions, thus preventing the screw from substantially being displaced and largely deviating from the preset pressure at the time of the changeover of the pressure.

2 Claims, 7 Drawing Sheets

| NUMBER I OF INJECTION STAGES | INJECTION SPEED Vi | CHANGEOVER POSITION Pi | POINTER i |
|---|---|---|---|
| 1st INJECTION STAGE | V0 | P0 | 0 |
| 2nd INJECTION STAGE | V1 | P1 | 1 |
| ...... | ...... | ...... | ...... |
| Ith INJECTION STAGE | V(I-1) | P(I-1) | (I-1) |

| NUMBER J OF DWELL STAGE | DWELL PRESSURE Prj | DWELL TIME Tj | POINTER j |
|---|---|---|---|
| 1st DWELL STAGE | Pr0 | T0 | 0 |
| 2nd DWELL STAGE | Pr1 | T1 | 1 |
| ...... | ...... | ...... | ...... |
| Jth DWELL STAGE | Pr(J-1) | T(J-1) | (J-1) |

FIG. 8

| NUMBER K OF METERING STAGES | BACK PRESSURE Pbk | NUMBER OF REVOLUTION Nk | CHANGEOVER POSITION Pk | POINTER K |
|---|---|---|---|---|
| 1st METERING STAGE | Pb0 | N0 | P0 | 0 |
| 2nd METERING STAGE | Pb1 | N1 | P1 | 1 |
| ...... | ...... | ...... | ...... | ...... |
| Kth METERING STAGE | Pb(K-1) | N(K-1) | P(K-1) | (K-1) |

TB3

METHOD OF CONTROLLING ELECTRICALLY OPERATED INJECTION MOLDING MACHINE

BACKGROUND OF THE INVENTION

1. Field of the Invention

The present invention relates to a method of controlling an electrically operated injection molding machine, and more particularly, is directed to a control of injection, dwell and back pressure.

2. Description of the Related Art

In a typical electrically operated injection molding machine, its screw is axially driven by a drive of a servomotor to control injection, dwell and back pressure thereof. The injection process among them generally undergoes a multi-stage control of injection speed in which its screw stroke is divided into a plurality of segments and the injection speed is assigned each of the segments. Furthermore, the conventional dwell process is subjected to a dwell control where an injection servomotor receives a movement instruction to bring a screw to an extremity of cylinder, and is driven in compliance with a set dwell speed instruction with its output torque being restricted to a set dwell. As a result, even though the screw is driven toward the injection direction by driving the servomotor with its output torque restricted, the amount of movement of the screw is relatively small due to the filling of a mold with a resin, and accordingly a positional deviation relative to the instructed position increases with time. Irrespective of the increase in the positional deviation, however, as the output torque of the servomotor is restricted to a set value, the servomotor is not permitted to produce an excessive torque beyond the set value, to consequently subject the resin to a set dwell pressure corresponding to a restricted torque value. In this manner, the known electrically operated injection molding machine undergoes a dwell control through the restriction of the output torque of the injection servomotor.

Moreover, the conventional metering process employs a pressure control of a type in which the injection servomotor rotates the screw with its output torque set to present a predetermined back pressure, during which the resin melts to increase the resin pressure, and the screw retreats when the resin pressure is larger than the torque produced by the injection servomotor, to consequently subject the resin to the back pressure which has been set. Also known is a back pressure control of a type in which the screw is caused to retreat by a predetermined amount every time the resin pressure surpasses the given back pressure, to thereby confer the given back pressure on the resin.

As described hereinbefore, the conventional electrically operated injection molding machine requires a changeover from the screw position control (or speed control) to the pressure control when changing over from the injection process (or injection speed control process) to the dwell process. Furthermore, it is necessary to change over from the pressure control to the position control if the back pressure at metering is controlled based on the screw position at the time of changeover from the dwell process to the metering process.

Additionally, it is very common in the dwell control to segment the dwell pressure into several stages for the control thereof. Accordingly, in the case where the dwell control is performed with the restricted output torque of the injection servomotor, the torque produced by the servomotor balances with the resin pressure for the dwelling. As a result, if the dwell pressure is changed from a larger value to a smaller one, the valance is lost and the resin pressure becomes remarkably larger than the pressure corresponding to the restricted output torque of the servomotor, whereby the screw may be pushed away and forced to retreat to a great extent. This disadvantageously leads to an improper dwell control.

On the contrary, providing that the dwell pressure is changed from a smaller value to a larger one, the output torque of the servomotor is enhanced in response to the changeover, but the screw is allowed to move only at the predetermined speed in accordance with the dwell speed instruction. Hence, there arises a time lag to reach a newly set dwell pressure, which disadvantageously results in a dwell control having poor response characteristic.

DISCLOSURE OF THE INVENTION

It is therefore an object of the present invention to provide a method of controlling an electrically operated injection molding machine in which its dwell control is effected though the control of screw positions.

Another object of the present invention is to provide a method of controlling an electrically operated injection molding machine in which its injection, dwell, and back pressure are entirely controlled based on positions of a screw.

In order to accomplish the above objects, in a method of controlling an electrically operated injection molding machine in accordance with the present invention having a screw axially driven by a servomotor for the control of an injection, dwell and back pressure and including a dwell process, the dwell process comprises the steps of detecting a pressure applied to a resin; finding a difference between a dwell pressure which has been set and the detected pressure; and issuing a movement instruction in response to the difference to a servo circuit for drivingly control the servomotor, to thereby perform a feedback control in such a manner that the pressure applied to the resin is correspondent to a set pressure. Preferably the dwell process further comprises the steps of dividing the dwell process into a plurality of steps; setting a dwell pressure and a dwell time for each of stages; when entering the dwell process, changing over to a dwell pressure set for each of stages until the lapse of the dwell time correspondingly set for each of the stages in sequence from the first dwell which has been set, whereby the position of the screw is feedback controlled in such a manner that the detected resin pressure corresponds to the dwell pressure which has been set.

Moreover, in a method of controlling an electrically operated injection molding machine in accordance with the present invention having a screw axially driven by a servomotor for the control of injection, dwell, and back pressure, and including an injection process, a dwell process, and a metering process, the injection process comprises the step of controlling the speed of the servomotor so as to reach an injection speed which has been set; the dwell process comprises the steps of detecting a pressure applied to a resin; finding a difference between a dwell pressure which has been set and the detected pressure; and issuing a movement instruction in response to the difference to a servo circuit for drivingly control the servomotor, to thereby perform a feedback control in such a manner that the pressure applied to the resin corresponds to the dwell pressure which has been set; the metering process comprises the steps of detecting a pressure applied to a resin; finding a difference between a back pressure which has been set and the detected pressure; and issuing a movement instruction in response to said difference to a servo circuit for drivingly control said servomotor, to thereby perform a feedback control in such a manner that the back pressure corresponds to the back pressure which has been set. Also in this case, the injection process, dwell process, and metering process may be divided into a plurality of steps, respectively. The injection process further comprises the step of setting an injection speed for each of stages and a changeover screw position to the subsequent stage; and changing over to an injection speed set for the subsequent stage every time the screw arrives the changeover screw position to the subsequent stage; the dwell process further comprises the steps of setting a dwell pressure and a dwell time for each of stages; changing over to a dwell set for the subsequent stage based on the dwell time correspondingly set for each of stages; and the metering process further comprises the steps of setting the number of screw rotation and back pressure for each of stages, and a changeover screw position to the subsequent stage; and changing over to a back pressure set for the subsequent stages every time the screw reaches the screw position leading to the subsequent stage. In each of the processes, the screw position is feedback controlled so that there can be accomplished the injection speed individually set for each of the stages, the dwell pressure set for each of the stages, and the back pressure set for each of the stages.

According to the present invention as described hereinabove, in the dwell process, the detected pressure applied to the resin is compared with the dwell pressure which has been set to thereby obtain a difference, based on which is issued a movement instruction, in response to which the screw is caused to move to the target position. For example, if there arises a pressure deviation as the detected pressure does not reach the dwell pressure which has been set, a movement instruction to advance the screw is issued in response to the deviation. The screw is thus allowed to move forward, and hence the pressure applied to the resin is gradually increased to approach the dwell pressure which has been set. Accordingly as the pressure deviation is diminished, the displacement of the screw is also lessened, and finally the pressure applied to the resin becomes kept at the dwell pressure which has been set. On the contrary, in the case where the set dwell pressure is changed over from a larger value to a smaller value, the pressure deviation becomes negative (that is, the resin pressure is larger than the target value) which results in the issue of a movement instruction to retreat the screw. The screw is thus allowed to retreat. In this case, if the screw is forced to retreat beyond the amount given by the movement instruction due to the pressure of resin, the sign of the positional deviation is inverted and the screw receives a forward movement instruction, to finally keep the position instructed by the movement instruction. In this manner, the screw is displaced up to the position instructed by the movement instruction. Since this movement causes the resin pressure to be reduced, the resin pressure approaches the dwell pressure which has been set for the execution of a feedback control to bring the pressure deviation to "0". In this case, the output torque of the injection servomotor for driving the screw is not restricted, and hence the screw is allowed to forward to the target position with a large torque to promptly reach the target position. Thus, the screw position is so controlled that the pressure deviation becomes "0". As a result, the dwell control is accomplished based on the screw position, thereby preventing the screw from being pushed away by the resin pressure at the time of changeover of the dwell pressure which would otherwise result in a great retreat of the screw or a considerable delay in reaching the set pressure. In other words, since the servomotor is operated to hold the instructed position, if there arises a deviation between the instructed position and the actual position, it turns out an output torque (up to the maximum torque if necessary) so as to eliminate the deviation and holds the instructed position. While on the contrary, between the pressure actually applied to the resin and the set pressure there exist a pressure deviation, a movement instruction in response to which is issued to the injection servomotor. Accordingly, the servomotor is driven in such a manner that the screw arrives at the instruction position, and finally the screw position is controlled so as to hold the set pressure to thus ensure a proper dwell control.

Moreover, in the injection process, the speed control is so executed that the injection speed can be set in compliance with the screw position as in the conventional manner.

Also in the metering process, a resin pressure is detected to find a deviation between the resin pressure and a back pressure which has been set. In accordance with the deviation, a movement instruction is issued to the injection servomotor for the feedback control of the screw position, thereby controlling in such a manner that the back pressure corresponds to the back pressure which has been set. As a result, the processes of injection, dwell and metering can be consistently controlled throughout the entire process from injection, to dwell to metering control, by way of the control of the screw position without halfway changing over from the position control to the pressure control. This prevents a variety of problems from arising at the time of the changeover of the control, and the injection shaft has only to be activated for the automatic operation from initiation of the injection to the termination of metering, which leads to a simplification of the control interface. Additionally, the consistent control effected by a sequence program not an NC program ensures a high speed processing.

BRIEF DESCRIPTION OF DRAWINGS

FIG. 6 is an explanatory view of a table for storing molding conditions at the injection process in the same embodiment;

FIG. 7 is an explanatory view of a table for storing molding conditions at the dwell process in the same embodiment; and FIG. 8 is an explanatory view of a table for storing molding conditions at the metering process in the same embodiment.

BEST MODE FOR CARRYING OUT THE INVENTION

An embodiment of the present invention will now be described with reference to the accompanying drawings.

Figure 5:
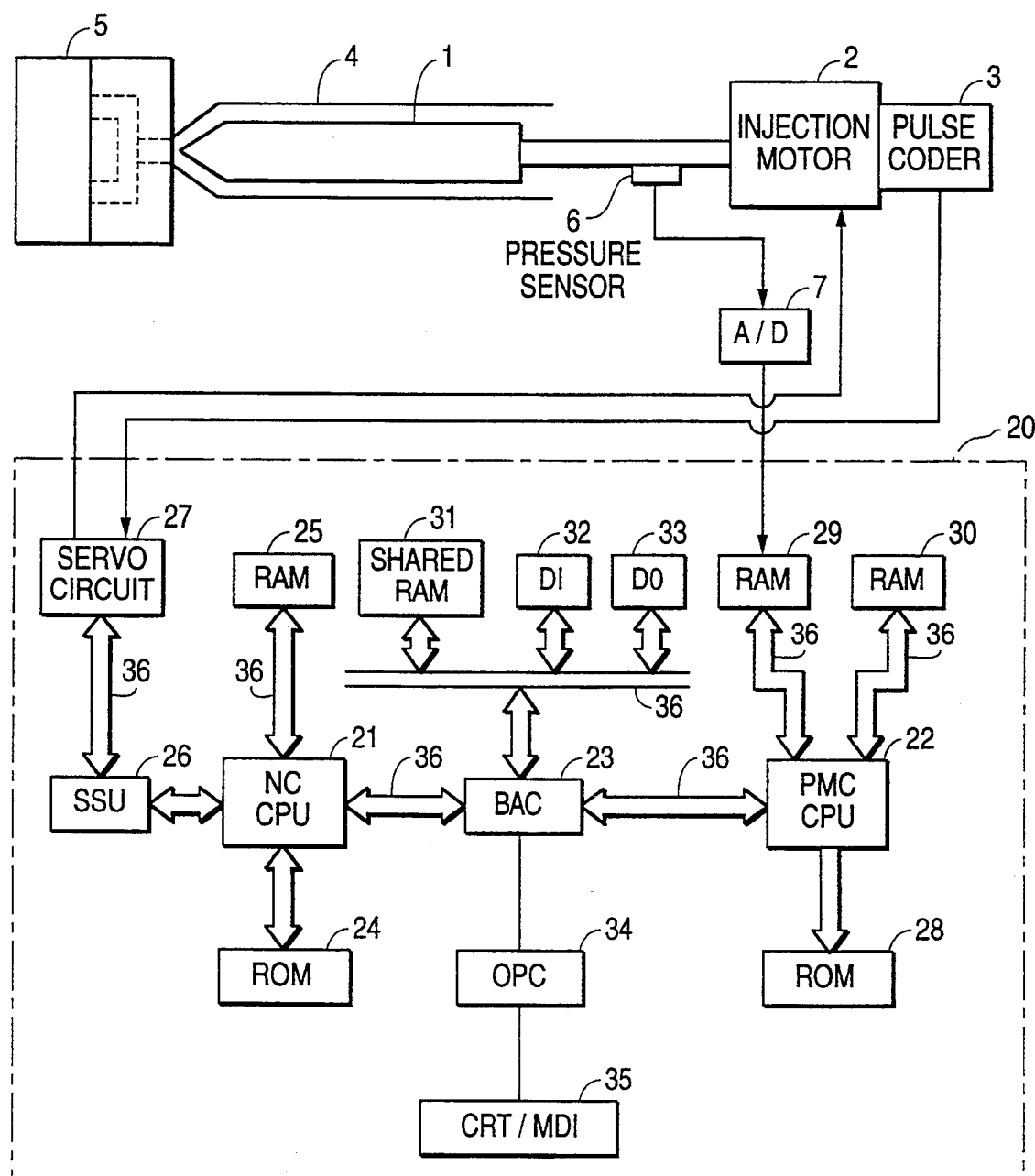
FIG. 5 is a block diagram showing a principal part of an electrically operated injection molding machine and a principal part of a controller for practicing the same embodiment.

FIG. 5 is a block diagram showing the principal part of an electrically operated injection molding machine for practicing the present invention, in which members associated with an injection shaft are only shown and members associated with the other shafts such as a clamping shaft, a screw rotating shaft and an ejector shaft are omitted. In the drawing, the electrically operated injection molding machine comprises a numerical control system 20 serving as a controller, a screw 1, an injection servomotor 2 for axially driving the screw 1, a pulse coder 3 affixed to the injection servomotor 2, a heating cylinder 4, a mold 5, a pressure sensor 6, and an analog-to-digital converter 7 (referred to as an A/D converter hereinafter). Among them the pressure sensor 6 includes a load cell mounted on a part of an injection mechanism (not shown) driven by the injection servomotor 2 and detects a pressure applied to the resin. Furthermore, the pressure sensor 6 is connected to the analog-to-digital converter 7 (referred to as the A/D converter hereinafter) which converts the analog outputs into digital signals.

The numerical control system 20 (referred to as an NC system hereinafter) for the control of the injection molding machine includes a microprocessor for NC and a CPU 22 for a programmable machine controller (referred to as a PMC hereinafter). The CPU 22 for the PMC is connected to a ROM 28 which stores, for example, a sequence program for controlling a sequential operation of the injection molding machine, a RAM 29 for receiving and storing a pressure detected from the pressure sensor 6 by way of the A/C converter 7, and a RAM 30 used for temporarily storing the data.

The CPU 21 for NC is connected to a ROM 24 which stores a managing program intended to overall control the injection molding machine, and through a servo interface 26 to servo circuits which drivingly control the servomotors of shafts correspondingly for injection, clamping, screw rotation, an ejector and the like. It is to be noted that only a servo circuit 27 associated with the injection servo motor 2 is shown in FIG. 5 among such servo circuits.

Furthermore, a nonvolatile shared RAM 31 includes of a bubble memory or a CMOS memory as a memory section which stores, for example, an NC program for controlling actions of the injection molding machine, and a setting memory section which stores a variety of setting values, parameters, and macro variables. A bus arbiter controller 23 (referred to as a BAC hereinafter) is connected to buses 36, respectively, of the CPU 21 for NC, the CPU 22 for the PMC, the shared RAM 31, an input circuit 32, and an output circuit 33, thereby effecting the control of the buses to be used. Additionally, a manual data input unit with a CRT display 35 (referred to as a CRT/MDI hereinafter) is connected via an operator panel controller 34 to the BAC 23 so as to input various instructions and setting data through the manipulation of control keys such as a soft key or a ten key. Incidentally, a RAM 25 which is connected via a bus to the CPU 21 for NC is utilized for temporary storage of data or other applications.

FIG. 5 exemplarily illustrates only members associated with the injection shaft, that is, the injection servo motor 2 which drives the screw 1 for injection, and the pulse coder 3 which is mounted on the injection servomotor 2 and detects the rotation of the servomotor to find out a screw position, although the other members associated with other shafts such as a clamping shaft, a screw rotating shaft, and an ejector shaft are not shown. Also, among the servo circuits in the NC system 20 the servo circuit associated with the injection servo motor is only shown, and those for the other shafts are omitted.

In accordance with the above configuration, the NC system 20 executes a sequential control based on a sequential program being stored within the ROM 28 with the aid of the CPU 22 for PMC, while CPU 21 for NC distributes pulses to each of the servo circuits corresponding to the respective servomotors based on a control program being set and stored within the shared RAM 31, thus driving the injection molding machine.

A resin pressure detected by the pressure sensor 6 is converted into a digital signal by means of the A/D converter 7 and is written to the RAM 29 every predetermined cycle to be sequentially rewritten as the present resin pressure. The CPU 22 for PMC reads out the resin pressure written to the RAM 29 every predetermined cycle, and sequentially writes the read values of resin pressure to the shared RAM 31 by way of the BAC 23. It is to be appreciated that the values of resin pressure detected by the pressure sensor 6 need not be stored except the present value, and hence it may be written into the register.

Operations of this embodiment will next be described with reference to flowcharts shown in FIGS. 1 to 4. First of all, molding conditions including ones with respect to an injection process, dwell process, and metering process must be set.

FIGS. 6 to 8 explanatorily show condition tables TB 1 to TB 3 which are provided in the shared RAM 31 to store operating conditions (or molding conditions) for the injection, dwell, and metering processes, respectively. After a desired molding condition setting screen is displayed on a CRT screen through the operation of the CRT/MDI 35, the corresponding molding conditions of the respective processes are input for setting in sequence.

With regard to the injection process, the number I of injection stages, injection speeds $V_i$ ($i=0$ to $I-1$) in the respective injection stages, and their changeover positions $P_i$ are set as shown in FIG. 6 to be stored in the table TB 1 provided within the shared RAM 31.

Regarding the dwell process, the number J of dwell stages, dwell pressures $Pr_j$ ($j=0$ to $J-1$) in the respective dwell stages, and dwell times $T_j$ of respective stages are each set as shown in FIG. 7 to be stored in the table TB 2 provided within the shared RAM 31.

As regards the metering process, the number K of metering stages, back pressures $Pb_k$ ($k=0$ to $K-1$) in the respective metering stages, screw revolutional speeds $N_k$, and their changeover positions $P_k$ are each set as shown in FIG. 8 to be stored in the table TB3 provided within the shared RAM 31.

It is to be noted that the tables TB1 to TB3 shown in FIGS. 6 to 8, respectively are designated with pointers i, j and k, which are merely for the convenience of explanation.

Figure 1:
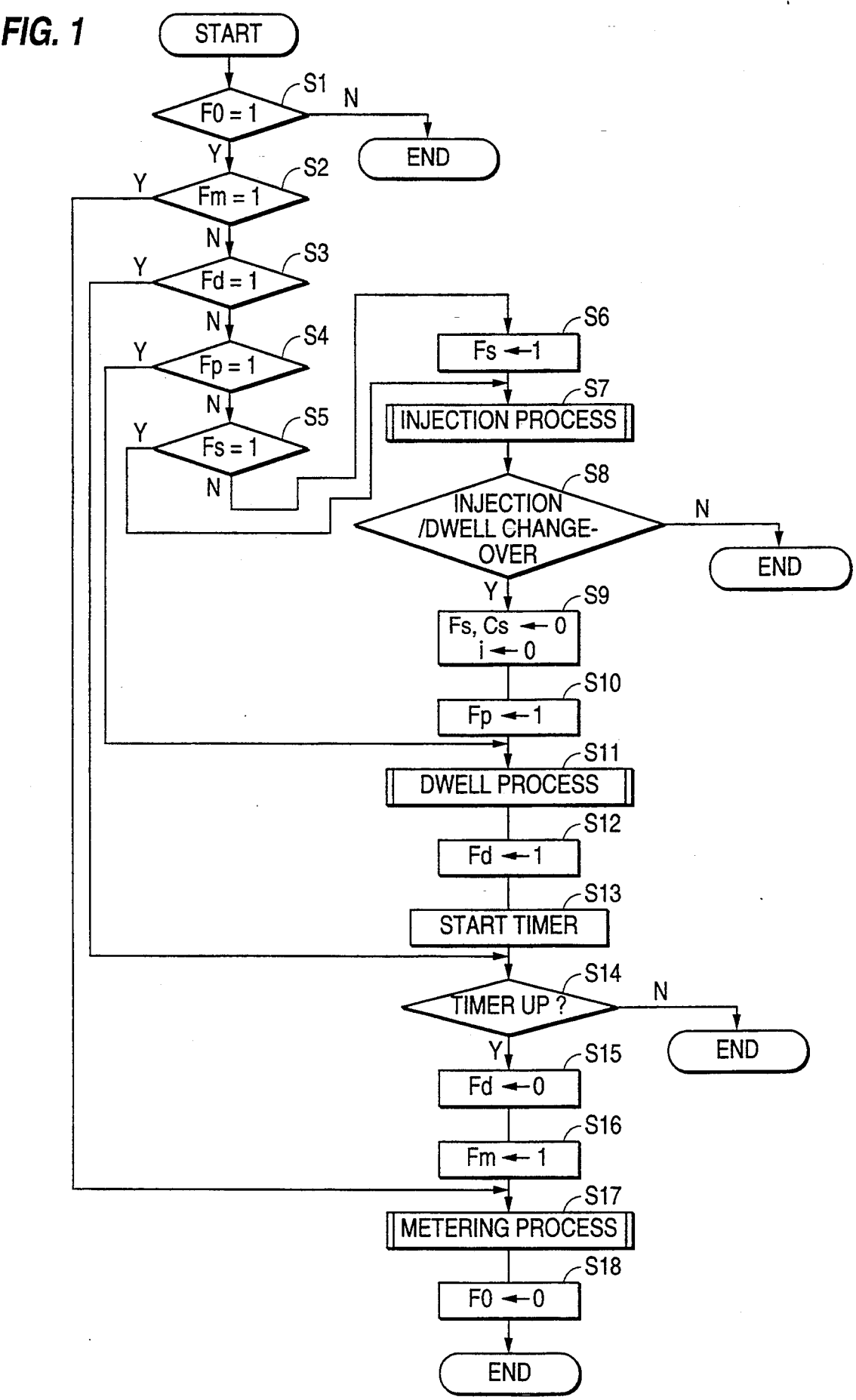
FIG. 1 is a flowchart showing a main processing of an injection shaft which is an embodiment of the present invention.

FIG. 1 is a flowchart showing a processing to be preformed during the operation of the injection shaft of the electrically operated injection molding machine used for practicing the present invention, in which the CPU 21 for NC executes this processing each predetermined cycle.

First, the CPU 21 for NC checks whether a flag F0 which shows that the clamping process has been completed and the injection shaft is in operation is "1" or not (Step S1) When entering an injection control process after the completion of the clamping process, the CPU 22 for PMC sets via the BAC 23 the flag F0 provided in the shared RAM 31 and showing that the injection shaft is in operation to "1". Therefore, if the flag F0 is "0", this processing terminates at once without any substantial execution.

When the flag F0 is judged to be "1", the CPU 21 for NC subsequently checks whether a flag Fm indicating that the machine is under metering process, a flag Fd indicating under dwelling which is equivalent to the period of being out of operation during the transition from the dwell process to the metering process, a flag Fp signaling under dwell process, and a flag Fs signaling under injection process are respectively "1" or not (Steps S2 to S5), each flag being provided within the shared RAM 31. In the initial cycle processing where the flag F0 has been set to "1", these flags Fm, Fd, Fp, Fs are equally "0". Accordingly, the procedure is allowed to advance from Step S5 to Step S6, and the flag Fs indicating that the machine is under injection process is set into "1" to initiate the processing in the injection process shown in FIG. 2 (Step S7).

The processing in the injection process will be described later with reference to a flowchart shown in FIG. 2. When the processing in that cycle of the injection process is completed, the CPU 21 for NC decides whether a changeover from the injection to the dwell should be made or not (Step S8). The changeover from the injection to the dwell is to be controlled in accordance with a screw position, a pressure applied to the resin, or an elapsed time from the initiation of injection. The CPU 22 for PMC detects such screw position, resin pressure, or the elapsed time, and upon reaching the predetermined changeover point, sets a flag to "1" which is provided within the shared RAM 31 and indicates the changeover from the injection to the dwell. The CPU 21 for NC judges whether the changeover to the dwell should be made or not depending on whether the flag is "1". When not reaching the changeover point, the processing in that cycle comes to an end.

On the contrary, when the flag indicating the changeover to the dwell is "1" at Step S8, in other words, when the changeover point to the dwell has been reached, the flag Fs indicating that the machine is under the injection process and a flag Cs indicating that it is in process of each stage during the injection process which will be described later are set to "0" (Step S9). Simultaneously, a pointer i representing each stage in the projection process is set to "0" (Step S9), whereas the flag Fp signaling under dwell process is set to "1" (Step S10) to initiate the processing in the dwell process shown in FIG. 3 (Step S11).

In the subsequent cycles, the processing at Steps S1 to S4 is followed by a jump to the Step S11 to execute the dwell process until the completion of the dwell process with the flag Fp set to "1". The processing in the dwell process will be discussed hereinbelow with reference to the flowchart shown in FIG. 3.

After the completion of the dwell process, the flag Fd indicating under dwelling is set to "1" (Step S12), and a timer is set at a predetermined dwell time and started (Step S13). This dwell process is intended to bring the injection shaft to a rest, and then the processes in the Steps S1 to S3 and Step S14 are repeated each cycle until the end of the interval of time for which the timer is set. When the timer is up (Step S14), the flag Fd indicating that the machine is under dwelling is set to "0" (Step S15), while the flag Fm indicating under metering process is set to "1" (Step S16) to initiate the action in the metering process (Step S17). The processing in the metering process will be discussed later with reference to the flowchart shown in FIG. 4. In the subsequent cycles, the processes in the Steps S1, S2 and S17 are executed until the processing in the metering process has been completed. After the completion of the metering process, the flag F0 indicating that the machine is in process of controlling the injection shaft is set to "0" (Step S18) to terminate the process in that processing cycle.

Figure 2:
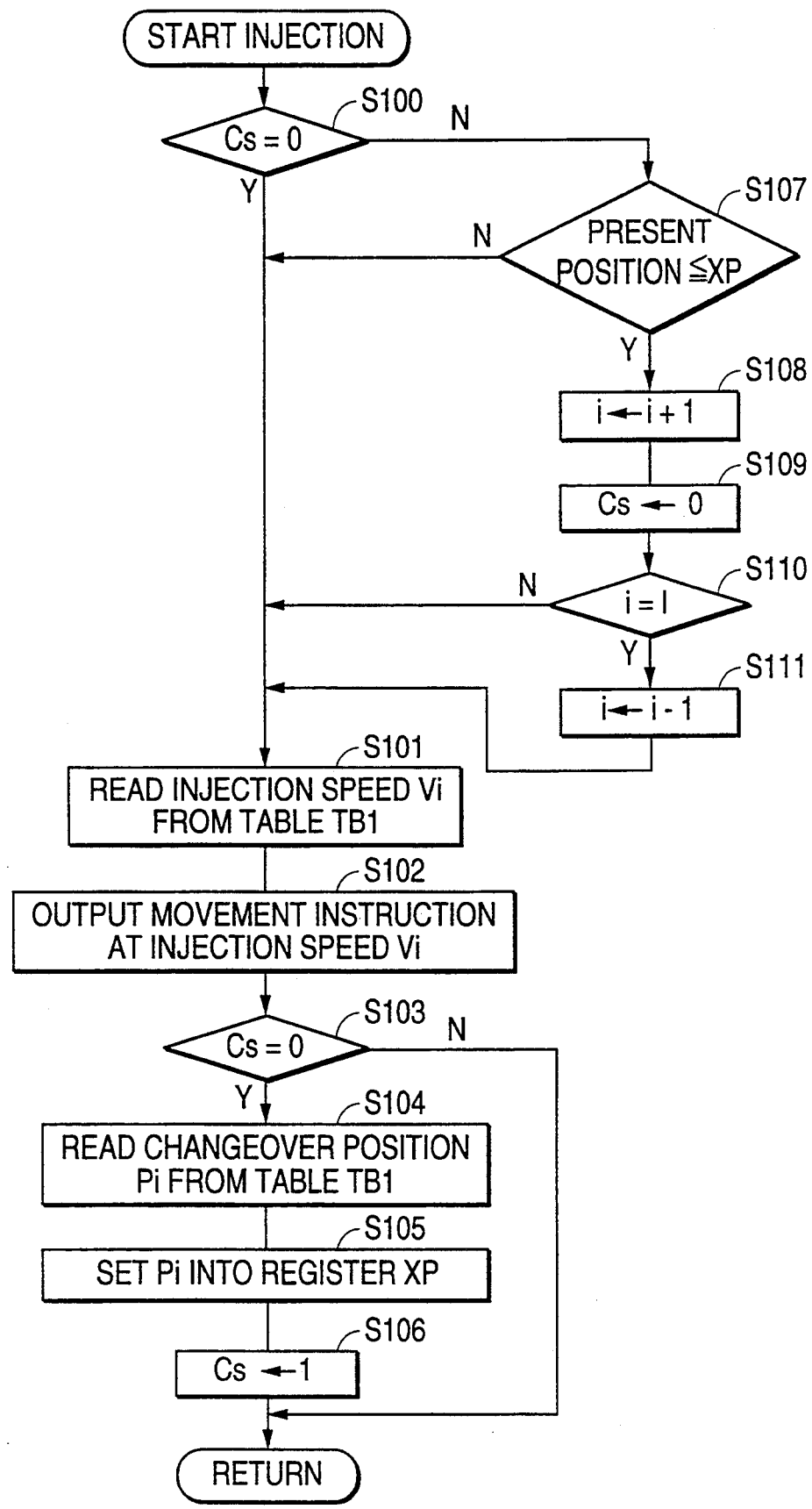
FIG. 2 is a flowchart showing a processing at an injection process in the same embodiment.

FIG. 2 is a flowchart representing the processing in the injection process in the Step S7. When entering the injection process, it is judged whether the flag Cs is "0" or not (Step S100). Since the flag Cs is initially set to "0" by initialization or a process at Step S109 to be described later, the procedure is allowed to advance from Step S100 to Step S101. Then, an injection speed Vi which corresponds to a pointer i (0 through I−1 are assigned as the pointer i to the first through the I-th injection stages, respectively, as shown in FIG. 6) which is stored in the table TB1 within the shared RAM 31 is read (Step S101), and the issue of injection instructions, that is, a pulse distribution is commenced at the injection speed Vi (Step 101, 102). As a result, a movement instruction is issued to the servo circuit 27 through the servo interface 26, and hence the injection servo motor 2 is activated to forward the screw 1 (leftward in FIG. 5) at the set injection speed Vi. It is to be noted that the pointer i is initially set to "0" by initialization and the process at Step S9.

Afterwards, the CPU 21 for NC judges whether the flag Cs is "0" or not (Step S103). As the flag Cs is initially "0", a changeover position Pi corresponding to the pointer i is read out from the table TB1 (Step S104), and set into a register XP (Step S105). Then the flag Cs is set to "1" (Step S106) and the procedure returns to Step 8 in the flowchart shown in FIG. 1 comprising a main process.

In the subsequent cycle, after processing at Steps S1 through S5, the procedure advances from Step S5 to Step S7 or Step S 100 in the flowchart shown in FIG. 2. In this case, the flag Cs remains set to "1" at Step S106 in the preceding cycle, and hence the procedure is allowed to advance from Step S100 to Step S107 where a comparison is made between the present position of the screw 1 and a changeover position from that injection stage to the next stage which has been set in the register XP. While on the contrary, the present value of the screw 1 can be obtained by integrating pulses to be distributed by the CPU 21 for NC in a present value register provided within the shared RAM 31. Therefore, for the comparison described above, the present position is read out form this present value register to judge whether the obtained value is not more than the set value stored within the register XP or not. In this embodiment, the extremity of the cylinder 4 is used as the origin in the Cartesian coordinate system of the screw 1, whose minus direction is a direction in which the screw 1 advances (in other words, in which the screw moves close to the mold, that is, the leftward direction in FIG. 1). Accordingly, the fact that the present value of the screw 1 is more than the value stored within the register XP means that the screw has not yet reached the changeover position from the present step to the next step. In such a case, the Step S107 is followed by Step S101 to repeat the above-described processing. Then, the flag Cs has been already set to "1", and hence the procedure returns directly from the Step S103 to the main processing in the flowchart shown in FIG. 1 without performing the processes at Steps S104 through S106 and accordingly without rewriting the register XP. In case of the return to the main processing, the present processing will come to an end without further advancement because of initially having not arrived the changeover position (Step S8). Subsequently, the processes at Steps S1 to S5, S100, S107, S101 to S103 described above are repeated each cycle, and the screw is driven at the injection speed at the present stage until the screw position corresponds to the position set in the register XP.

When the value representing the present position of the screw 1 becomes less than the one representing the changeover position set in the register XP, the procedure advances from Step S107 to Step S108 to increment the pointer i by "1", and the flag Cs is set to "0" (Step S109). If the pointer i has not yet corresponded to the preset number I of the injection stages (Step S110), then the advancement to Step S101 is permitted to read out the injection speed Vi corresponding to the pointer i from the table TB1, and the servomotor 2 is driven so as to drive the screw at that injection speed (Step S102). As the flag Cs remains set to "0", the changeover position Pi corresponding to the pointer i is read out from the table TB1 and set into the register XP as described above (Steps S104 and S105). The flag Cs is then set to "1" (Step S105) to return to the main processing. This causes the screw to be driven at the injection speed at the next stage.

Afterwards, the above-described processing is repeated to drive the screw up to a correspondingly set changeover position Pi at an injection speed Vi set for each of the stages. When the pointer i comes to corresponds to the preset number I of the injection stages (Step S110), the present pointer is decremented by "1" (Step S111) for the execution of the processing at Step S101 and the succeeding steps.

In the case where the changeover from the injection to the dwelling is carried out based on the screw position, when the value of the position of the screw 1 becomes less than that of the final changeover position of the set I-th injection stage, the CPU 22 for PMC issues a changeover instruction to change from the injection to the dwelling, and the flag provided within the shared RAM 31 is set to "1". Accordingly, at Step S8 in the main processing it is judged that this flag is "1", and the procedure advances to the Step S9 where the flags Fs and Cs are set to "0" and the pointer i is allotted "0" (Step S 9), and then the flag Fp is set to "1" (Step S10) to initiate the dwell process.

Alternatively, in the case where the changeover from the injection to the dwelling takes place based on the time or resin pressure, even though the screw 1 reaches the changeover position of the final stage, a changeover instruction to the dwelling may not be issued from the CPU 22 for PMC because of having not arrived the predetermined time or resin pressure. Therefore, the screw 1 is caused to drive at the injection speed at the final stage until the changeover instruction to the dwelling is issued through the processing at Step S111 and Steps S101 to S106.

Figure 3:
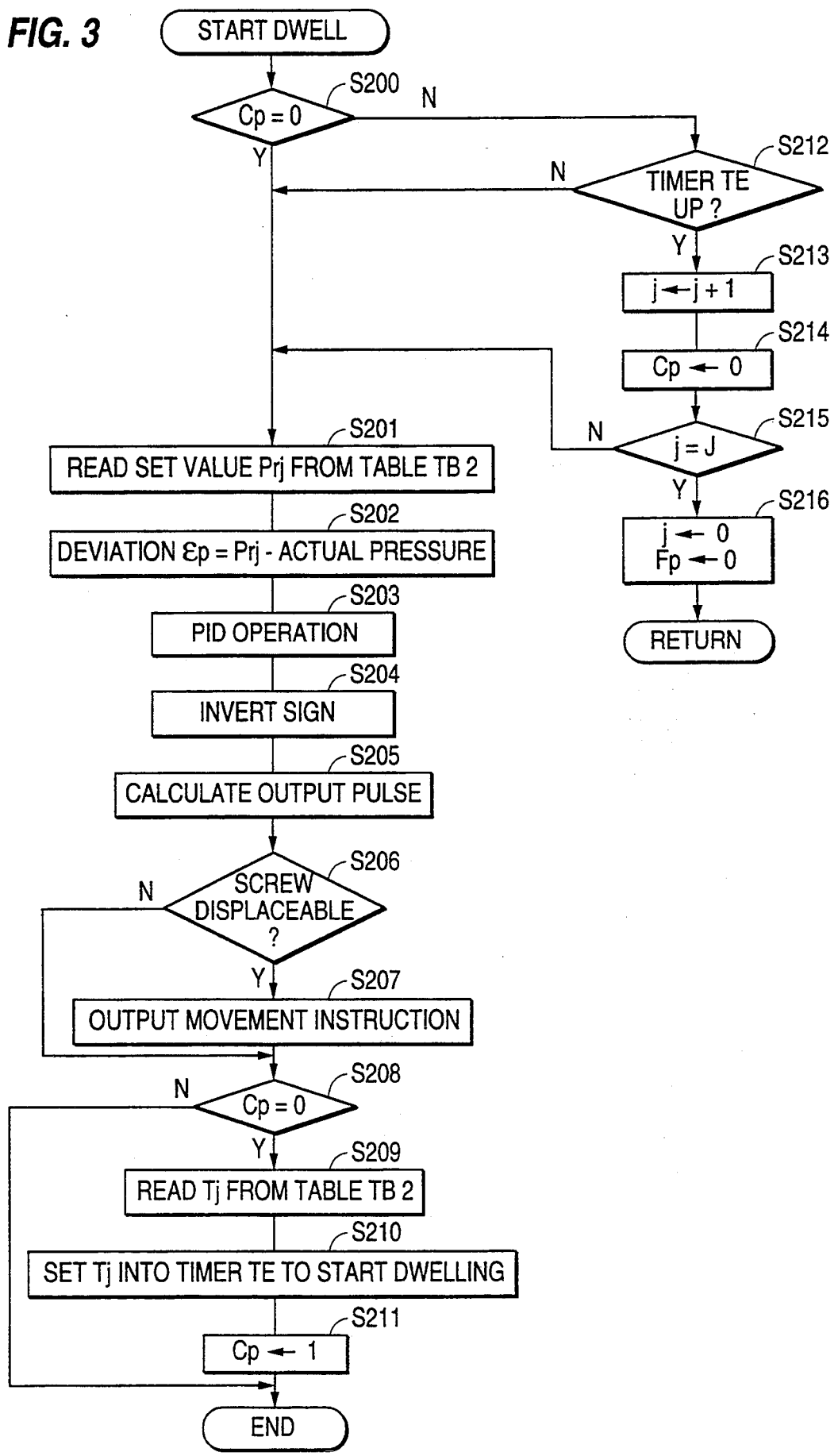
FIG. 3 is a flowchart showing a processing at a dwell process in the same embodiment.

In any case, when the changeover instruction is issued and the flag Fp is set to "1" (Step S10) to thereby enter the dwell process, the CPU 21 for NC initiates the processing shown in the flowchart in FIG. 3.

The CPU 21 for NC first judges whether the flag Cp is "0" or not (Step S200). It is to be appreciated that the flag Cp has been set to "0" by initialization. If the flag Cp is "0", then a set dwell pressure Prj corresponding to a pointer j (0 through J−1 are assigned as the pointer j to the first through the J-th dwelling stage, respectively, as shown in FIG. 7) is read out from the table TB2 stored within the shared RAM 31, and the actual pressure representing the present resin pressure which is stored within the shared RAM 31 is read out (Step S201). Subsequently, the actual pressure is subtracted from the set dwell pressure Prj to find a pressure deviation $\epsilon p$ (Step S202). On the basis of the pressure deviation $\epsilon p$ is carried out a proportional plus integral plus derivative control (PID control). That is, a value obtained by multiplying a proportional constant and the pressure deviation $\epsilon p$ together, a value obtained by multiplying together an integral constant and a value integrating the pressure deviations $\epsilon p$ detected every cycle, and a value obtained by multiplying together a differential constant and a difference between the present cycle and the preceding cycle in the pressure deviation $\epsilon p$ are summed up for the PID operational process, and the sign of the resultant value is inverted (Steps S203 and S204). This sign inversion is effected in that the extremity of the cylinder is located at the origin "0" and the direction in which the screw moves toward the origin is negative. In other words, the sign inversion is made due to the fact that the screw is to be displaced forward (toward the origin) although the pressure deviation $\epsilon p$ is positive when the actual pressure does not correspond to the set dwell pressure. On the contrary, providing that the pressure deviation $\epsilon p$ is defined as "the actual pressure—Prj", then the process at Step S204 can be omitted.

Subsequently, the amount of pulse to be output as a movement instruction is calculated based on the value obtained by inverting the sign of the value obtained through the PID operational processing (Step S205). As there is a proportional relationship between the pressure deviation $\epsilon p$ and the screw position, the amount of pulse to be output can be determined by multiplying together a predetermined proportional constant and the value obtained by inverting the sign of the value obtained through the PID operational processing. The amount of the pulse which has been already output is then added to thus obtained amount of the pulse to be output, thereby judging whether the screw is displaceable or not (Step S206). More specifically, if the screw is moved beyond its displaceable range (from the extremity of the cylinder to the maximum retreated position of the screw), the screw or cylinder may be damaged, and accordingly the movement instruction is not issued. On the contrary, if the screw is allowed to move, the amount of pulse which has been calculated as described above is transmitted to the servo circuit 27 by way of the servo interface 26 (Step S207).

In the case where the pressure deviation εp is relatively large and hence the amount of the output pulse is increased to cause the screw to surpass the displaceable range, the screw commonly follows the movement instruction with a time lag, which leads to a positional deviation. This positional deviation increases torque instructions in sequence through an integrator for the speed loop control in the servo circuit 27, which results in the increase in the output torque of the servomotor. Thus, without entirely outputting the amount of pulse which has been calculated at Step S205, the resin pressure is permitted to approach the set dwell pressure.

It is then judged whether the flag Cp is "0" or not (Step S208). In the event of "0" (although initially set to "0"), a dwell time Tj represented by a pointer j is read out from the table TB2 and is set into a timer TE. The dwelling is thus initiated and the flag Cp is set to "1" (Steps S209 through S211), thereby terminating the processing in the present cycle without returning to the main processing shown in the flowchart in FIG. 1. If the flag Cp is "1" at Step S208 described above, the processing in the present cycle is terminated without performing the processes at Steps S209 through S211.

In the next cycle, the processing at Steps S1 through S4 is followed by Step 200. With the flag Cp set to "1" the procedure further advances to Step S212 to decide whether the timer TE is up or not. If not time-up, as the flag Cp remains set to "1", the above-described processes at Steps S201 through S208 are repeated to terminate the processing in the present cycle (without performing the processes at Steps S209 to S211). Afterwards, the above-described processing is carried out for each of cycles. As a result, the screw position can be controlled in such a manner that a set dwell pressure Prj is applied for the preset dwell time Tj in a dwell stage corresponding to a pointer j.

When the timer TE is thus up (Step S212), the pointer j is incremented by "1" (Step S213), and the flag Cp is set to "0" (Step S214). Subsequently, if the pointer j does not correspond to the set number J of dwell stages (Step S215), then the above-described processes at step S201 and the succeeding steps are repeated. In this case, as the pointer is incremented by "1", a set dwell pressure Prj for the next stage is read out at Step S201. In addition, as the flag Cp remains set to "0", a dwell time Tj for the next stage is set into the timer TE at Steps S209 and S210. Afterwards, the screw position is controlled so as to be correspondent to a set dwell pressure until the timer TE is up for each of cycles.

When the timer TE is up, the pointer j is incremented as described above, and the screw position is controlled for a dwell time set for each of the stages so as to be correspondent to the dwell pressure set for each of the stages in sequence. Finally, when the value of the pointer j comes to corresponds to the number J of the set dwelling steps (Step S215), the pointer j and the flag Fp are both set to "0" (Step S216) to terminate the dwell process. The procedure then returns to the main processing shown in the flowchart in FIG. 10 where the flag Fd indicating under dwelling is set to "1" (Step S12), and the timer to which a predetermined dwell time is set is started (Step S13). Afterwards, the processes at Steps S1 through S3 and Step S14 are executed for each of cycles to wait for the time-up of the dwelling timer.

Since the screw position is controlled so that a dwell pressure set for each of stages can be obtained as described above, there is no possibility that the screw is pushed away by the resin pressure and retreated to a large extent even in the case of the changeover from a larger set dwell pressure to a smaller one. In other words, when the set dwell pressure is changed from a larger value to a smaller one, the pressure deviation εp to be calculated at Step S202 becomes negative, and hence the results of the PID operational process also becomes negative, which is then subjected to a sign inversion into positive value, to thereby output the amount of pulse which causes the screw to move backward. In this case, as the servomotor is free from a torque restriction, the screw may be possibly retreated beyond the amount of the pulse described above. In such a case, there arises a negative positional deviation to allow the servomotor to output the output torque for the positioning the screw so that the screw can reach the position corresponding to the amount of the output pulse, thus preventing the screw from retreating to a great extent.

While on the contrary, in the case of the changeover from a smaller value to a larger one, a positive pressure deviation εp is generated, the amount of pulse according to which is to be output. In this case, as the servomotor is not subjected to a torque restriction and is capable of producing a large output torque, the screw is caused to forward in such a manner that a resin pressure immediately becomes a set dwell pressure, to be thereby positioned at the target screw position.

Figure 4:
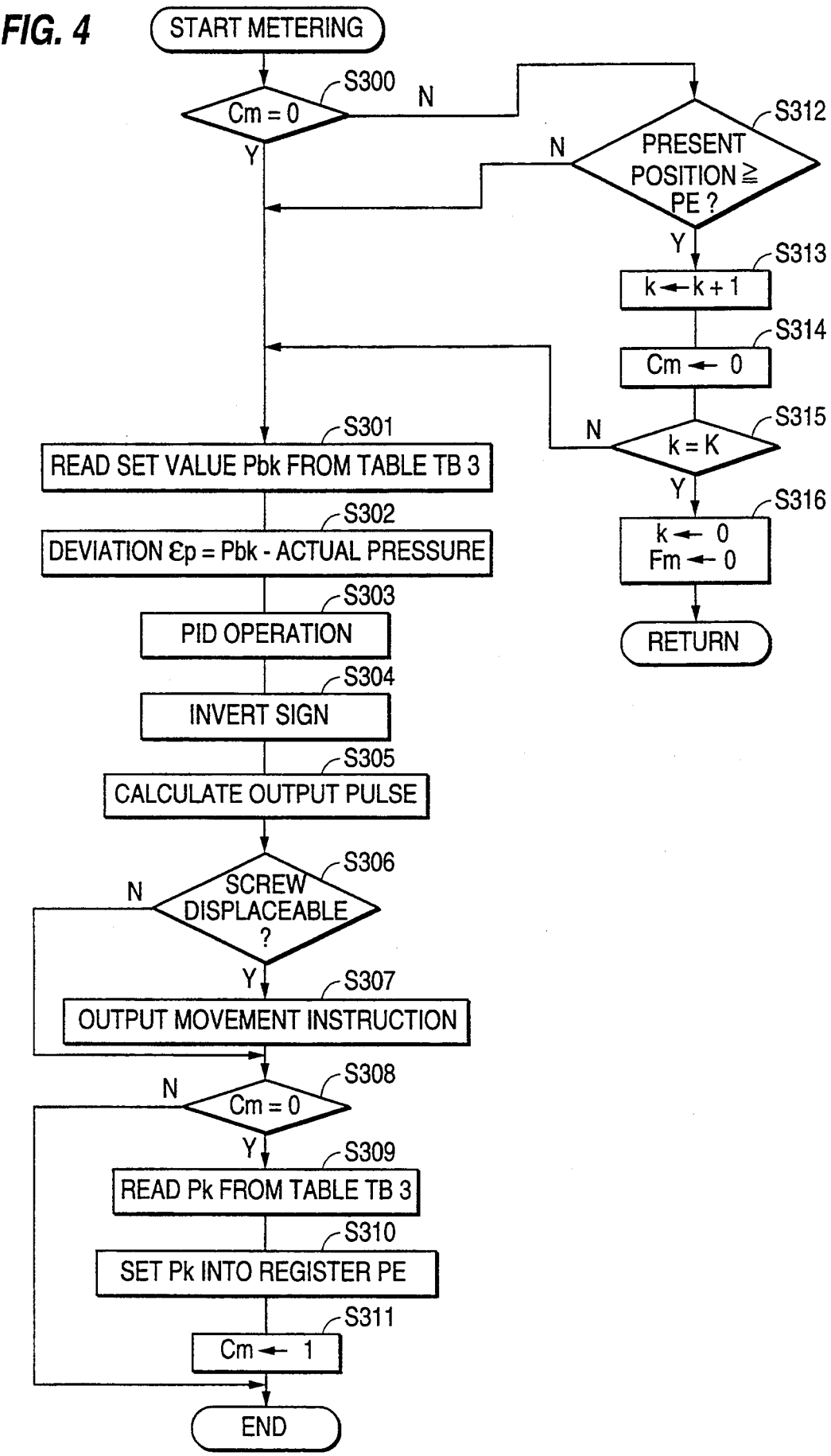
FIG. 4 is a flowchart showing a processing at a metering process in the same embodiment.

When the timer is up and the dwell process is terminated (Step S14), the flag Fd for dwelling is set to "0" and the flag Fm indicating under metering process is set to "1" (Steps S15 and S18) to initiate the processing at the metering process shown in the flowchart in FIG. 4. In order to rotate the screw at the metering process, the servomotor for rotating the screw is drivingly controlled at a number Ni of rotations set for each of metering stages. However the control of the number of screw rotations is not a gist of the present invention, and hence the description thereof will be omitted.

The back pressure control in the metering process undergoes the same process as that in the above-described dwelling control. More specifically, the CPU 21 for NC judges whether a flag Cm is "0" or not (Step S300). It is to be noted that the flag Cm is initially set to "0". If the flag Cm is "0", then a back pressure Pbk which has been set corresponding to a pointer k (0 through K−1 are assigned as the pointer k to the first through the k-th dwell stages as shown in FIG. 8) is read out from the table TB3 provided within the shared RAM 31, and the actual pressure representing the present resin pressure stored within the shared RAM 31 is read out (Step S301). The actual pressure is then subtracted from the set dwell pressure Pbk to find a pressure deviation εp (Step S302). Based on the pressure deviation εp, the proportional plus integral plus derivative control (DIP control) is carried out in the same manner as in the dwell control, and the sign of the obtained value is inverted (Step S303 and S304). Subsequently, the value obtained by inverting the sign of the value obtained through the PID operational processing is multiplied by a predetermined proportional constant to determine the amount of pulse to be output (Step S305). The amount of pulse which has already been output is added to thus determined output amount of pulse to judge whether the screw is displaceable or not (Step S308). If the screw is to be moved beyond the displaceable range, a movement instruction is not allowed to be issued. On the contrary, if displaceable, thus calculated amount of pulse is output to the servo circuit 27 by way of the servo interface 28 (Step S307).

Subsequently, it is judged whether the flag Cm is "0" or not (Step S308). In the event of "0" (initially being set to "0"), a changeover position Pk corresponding to a pointer k is read out from the table TB3 and set into a register PE (Step S309 through S311). The flag Cm is then set to "1" (Step S311), and the processing in the present cycle comes to an end without returning to the main processing shown in the flowchart in FIG. 1. Incidentally, if the flag Cm is "1" at Step S308 described above, the processing in the present cycle is terminated without effecting the processes at Steps S309 through S311.

In the next cycle, the process at Steps S1 and S2 are followed by Step S300. As the flag Cm is herein set to "1", the procedure advances to Step S312 to compare a screw present position which is stored in a present value register with a changeover position Pk stored in the register PE. If the current position is less than the changeover position Pk and the screw has not reached the changeover position, as the flag Cm is "1", the above-described processes at Steps S301 through S308 are carried out to bring the processing in the present cycle to an end. Afterwards, the above processing is effected for each of cycles.

When the screw present position is not less than the changeover position Pk (Step S312), the pointer k is incremented by "1" (Step S313) and the flag Cm is set to "0" (Step S314). Subsequently, if the pointer k has not reached the set number K of metering steps (Step S315), the processes at Step 301 and the succeeding steps described above are executed. In this case, since the pointer k is incremented by "1", a back pressure Pbk set for the next stage is read out at Step S301. Furthermore, as the flag Cm is set to "0", a changeover position Pk for the next stage is set into the register PE at Steps S309 and S310. Afterwards, the back pressure Pbk which has been set is controlled to be kept until the screw reach this changeover position Pk.

When the screw present position arrives the changeover position which has been set into the register PE, the pointer k is incremented as described hereinbefore, and thereafter a feedback control is in sequence performed in such a manner the back pressure at each stage becomes a set back pressure Pbk in accordance with the changeover position Pk set for each of the stages. When the value of the pointer k reaches the number K which has been set of metering stages (Step S315), the pointer k and the flag Fm is set to "0" (Step S316) to terminate the metering process. The procedure then returns to the main process shown in flowchart in FIG. 1, and the flag F0 indicating that the injection shaft is in operation is set to "0" (Step S18) to advance to the clamping process which is a subsequent process. Afterwards, as the flag F0 remains set to "0", the process in each cycle for the control of the injection shaft is only Step S1.

As described in detail hereinbefore, the injection, dwell, and back pressure can thus be controlled by a screw position.

What is claimed is:

1. A method of controlling an electrically operated injection molding machine having a screw axially driven by a servomotor for the control of injection, dwell, and back pressure, and including an injection process, a dwell process, and a metering process,
   said injection process comprising the step of:
   controlling a speed of said servomotor to correspond to a set injection speed set in accordance with a screw position;
   said dwell process comprising the steps of:
   detecting a pressure applied to a resin;
   determining a difference between a set dwell pressure and said detected pressure; and
   issuing a movement instruction based on said determined difference to a servo circuit for controlling said servomotor to drive said screw to a screw position, to thereby perform a feedback control in such a manner that a pressure applied to the resin corresponds to the set dwell pressure;
   said metering process comprising the steps of:
   detecting a pressure applied to the resin;
   determining a difference between a set back pressure and said detected pressure; and
   issuing a movement instruction based on said determined difference to a servo circuit for controlling said servomotor to drive said screw to a screw position, to thereby perform a feedback control in such a manner that a pressure applied to the resin corresponds to said set back pressure.

2. A method of controlling an electrically operated injection molding machine according to claim 1, wherein said injection process, dwell process, and metering process are divided into a plurality of steps, respectively,
   said injection process further comprising the step of:
   setting an injection speed for each screw movement and setting a changeover screw position to a subsequent screw movement; and
   changing over to an injection speed set for the subsequent screw movement every time the changeover screw position reaches the subsequent stage;
   said dwell process further comprising the steps of:
   setting a dwell pressure and a dwell time for each screw movement; and
   changing over to a dwell set for the subsequent screw movement based on the dwell time set for each screw movement; and
   said metering process further comprising the steps of:
   setting a number of screw rotation and back pressure for each screw movement, and a changeover screw position to the subsequent screw movement,
   changing over to a back pressure set for the subsequent screw movement every time the screw reaches the screw position leading to the subsequent screw movement.

* * * * *